UNITED STATES PATENT OFFICE.

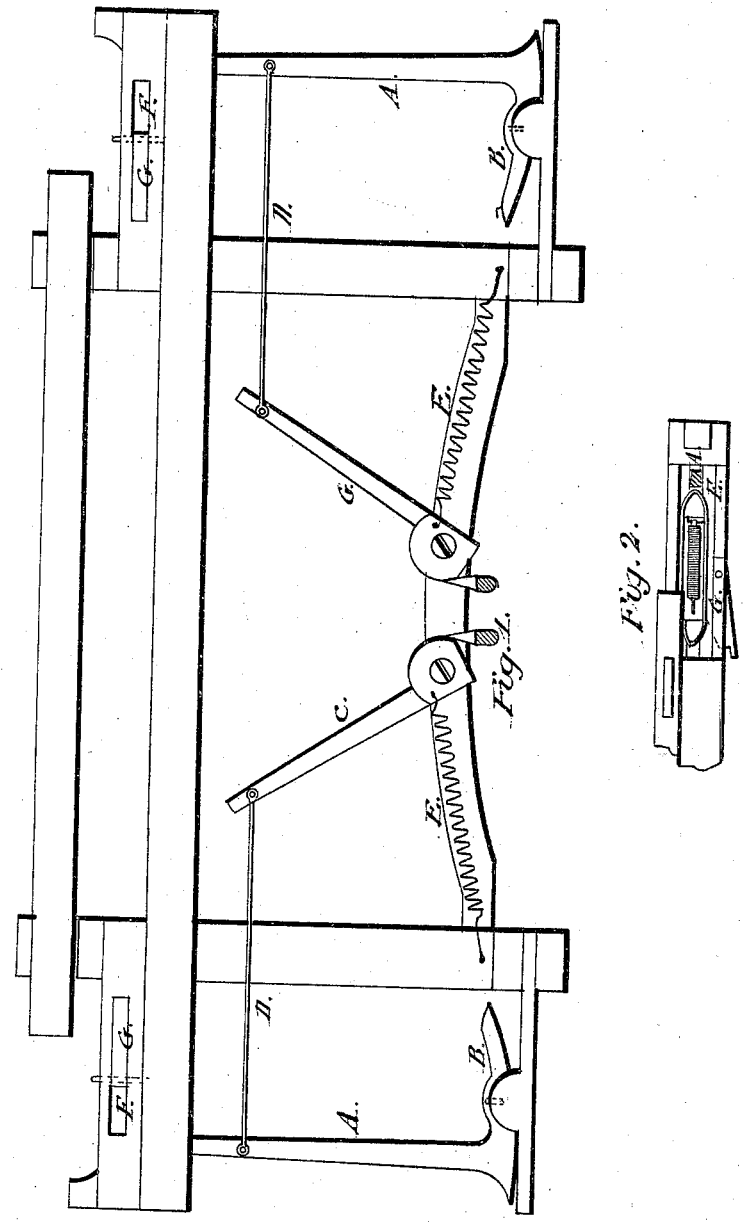

DANIEL BARNUM, OF BRIDGEPORT, CONNECTICUT.

POWER-LOOM.

Specification of Letters Patent No. 3,968, dated March 26, 1845.

*To all whom it may concern:*

Be it known that I, DANIEL BARNUM, of Bridgeport, in the county of Fairfield and State of Connecticut, have made certain new and useful improvements in the manner of arranging and combining the apparatus concerned in arresting the momentum and in throwing the shuttles in power-looms; and I do hereby declare that the following is a full and exact description thereof.

In the accompanying drawing Figure 1, is a front view of a part of a loom, showing the lace beam, the shuttle boxes, the picker staves, and the wag staves. Fig. 2 is a top view of one of the shuttle boxes, showing a spring which I attach to the protection guard for the purpose of arresting the momentum of the shuttle and the shuttle acting against said spring.

A, A, are the picker staves, which are each sustained on a wicker B, to cause the motion of its upper end to be in a right line. C, C, are the wag staves, D, D, being the rods by which they are connected to the picker staves. E, E, are spiral springs by which the wag staves are drawn back when relieved from the action of the treadles, leaving the shuttle box free for the entrance of the shuttle without the obstruction of a picker; the treadles are to be depressed by means of a cam in the ordinary way.

I do not employ any pickers in the shuttle boxes, but the heads of the picker staves, are capped with picker leather, or other suitable substance at their upper ends which are brought directly into contact with the shuttles.

To arrest the momentum of the shuttles, I attach an additional spring to the inside of the protection guard, as shown at F, Fig. 2, and when the shuttle comes into contact with the swell G of the guard and forces it out, so as to act on the protection, the spring F, is at the same time forced inward, and arrests the shuttle so as to prevent its striking against the end of the box with such force as would cause it to rebound; for as the additional spring is on one side, and the swell of the protection on the other side of the fulcrum the shuttle is pressed against the back of the box by the protection and the rebounding is consequently effectually prevented.

By the manner of combining and operating the wag staves, and picker staves and combining them with each other, and with the treadles, the friction of the apparatus is much less than under other construction, there is greater certainty of the action of the shuttle, and the apparatus is rendered more durable than heretofore.

Having thus fully described the nature of my improvements in the manner of arranging and combining the apparatus concerned in the arresting of the momentum, and in the throwing of the shuttle, what I claim therein as new and desire to secure by Letters Patent, is—

1. The employment of the spring F, on the inside of the protection guard in the manner and for the purpose described.

2. I also claim the particular manner of combining the treadles, the wag staves, and the picker staves with each other, as herein described and represented, so that they shall coöperate in producing the required motion as set forth.

I do not claim as new the manner of forming the picker staves with a rocker on their lower ends; nor do I claim the using them without the ordinary picker, this having been previously done, but limit my claim to the arrangement and combination above named.

DANIEL BARNUM.

Witnesses:
THOS. P. JONES,
WM. BISHOP.